United States Patent
Shimizu (10) Patent No.: US 7,595,804 B2
(45) Date of Patent: Sep. 29, 2009

(54) SYSTEMS AND METHODS FOR DISPLAYING INDIVIDUAL PROCESSOR USAGE IN A MULTIPROCESSOR SYSTEM

(75) Inventor: Clifford Shiroku Shimizu, Lake Forest, CA (US)

(73) Assignee: Unisys Corporation, Blue Bell ( * ) Notice: Subject to any disclaimer, the term of this patent is extended or adjusted under 35 U.S.C. 154(b) by 989 days.

(21) Appl. No.: 10/713,321

(22) Filed: Nov. 14, 2003

(65) Prior Publication Data

US 2005/0104799 A1    May 19, 2005

(51) Int. Cl.
*G09G 5/00*    (2006.01)

(52) U.S. Cl. .................. 345/538; 345/440; 345/467; 345/502; 345/530; 345/532; 345/536; 345/537; 345/541; 345/581; 345/636

(58) Field of Classification Search .......... 345/619, 345/636, 35, 440, 440.1, 440.2, 441, 467, 345/501, 530, 581, 589, 660, 1.1, 418, 532, 345/536, 537, 538, 541; 717/132, 127; 713/132
See application file for complete search history.

(56) References Cited

U.S. PATENT DOCUMENTS

| | | | | |
|---|---|---|---|---|
| 5,325,485 A | * | 6/1994 | Hochmuth et al. | 345/505 |
| 5,394,522 A | * | 2/1995 | Sanchez-Frank et al. | 715/735 |
| 5,751,965 A | * | 5/1998 | Mayo et al. | 709/224 |
| 5,819,028 A | * | 10/1998 | Manghirmalani et al. | 714/57 |
| 6,057,839 A | * | 5/2000 | Advani et al. | 715/784 |
| 6,188,973 B1 | * | 2/2001 | Martinez et al. | 702/188 |
| 6,456,306 B1 | * | 9/2002 | Chin et al. | 715/810 |
| 6,664,985 B1 | * | 12/2003 | Bormann et al. | 715/835 |
| 6,704,012 B1 | * | 3/2004 | Lefave | 345/440 |
| 6,828,975 B2 | * | 12/2004 | Noyle | 345/522 |
| 6,943,793 B2 | * | 9/2005 | Bowser et al. | 345/440.2 |
| 7,131,113 B2 | * | 10/2006 | Chang et al. | 717/128 |
| 2003/0071818 A1 | * | 4/2003 | Wilt et al. | 345/537 |
| 2003/0142143 A1 | * | 7/2003 | Brown et al. | 345/836 |
| 2005/0052438 A1 | * | 3/2005 | Shiuan et al. | 345/204 |
| 2005/0071613 A1 | * | 3/2005 | DeSylva et al. | 712/227 |

* cited by examiner

*Primary Examiner*—Bipin Shalwala
*Assistant Examiner*—Vince E Kovalick
(74) *Attorney, Agent, or Firm*—James E. Goepel; Phuong-Quan Hoang (57) ABSTRACT

A display of CPU utilization in a multiprocessor system is provided. This feature illustrates processor utilization and application group assignments to CPUs and clusters of CPUs. Various graphic indicator are described that can be used to display processor utilization and indicate processors that have no application group assignments. For example, bar graphs as well as gauge displays can be used to visually convey processor utilization. As a result, a user can visually determine the processor utilization and application group assignments across a multiprocessor system. Additionally, various colors and shadings can be used to visually convey application group assignments.

27 Claims, 6 Drawing Sheets
(4 of 6 Drawing Sheet(s) Filed in Color)

Prior Art

SYSTEMS AND METHODS FOR DISPLAYING INDIVIDUAL PROCESSOR USAGE IN A MULTIPROCESSOR SYSTEM

FIELD OF THE INVENTION

The present invention relates generally to the field of computing. More particularly, the invention relates to a system and method for displaying individual processor usage in a multiprocessor system.

BACKGROUND OF THE INVENTION

Multiprocessor systems are well understood computing platforms wherein processes are run simultaneously or concurrently on two or more CPUs. The most widely used multiprocessor systems employ a shared memory and a shared bus. Each CPU has an assigned portion of memory and the operating system manages the logical separation of memory among the multiple CPUs. The operating system typically manages access to the shared memory and uses a process of caching to reduce memory contention.

Some multiprocessor systems assign an application to a single CPU. Other, more sophisticated systems, allow a single application to be assigned to more than one CPU. In that instance, a given process of an application could run on any one of the preassigned CPUs. So for example, multiple processes affiliated with one application could simultaneously execute on two or more CPUs.

The assignment of applications to CPUs is generally referred to as CPU affinity. Ideally CPU affinity is selected in such a way to maximize system performance and to minimize movement of data from one CPU cache to another CPU cache.

The ability to monitor the load balance across the multiple CPUs is critical to maximizing the overall system performance. For example, it would be undesirable to have one CPU operating a near capacity while another CPU sits idle. Therefore, there is a need to be able to determine system performance at a CPU level in a multiprocessor system and not just measure the overall system performance.

SUMMARY OF THE INVENTION

The invention contemplates systems, methods and computer-readable media that provide graphic displays that displays processor usage on a display device. The method and system provides a first graphic type indicative of a processor. For example, for all of the CPUs in a system (or some subset thereof) a graphic is provided that is indicative of that processor. Additionally, on the same display, a second graphic type is provided that is indicative of an application group. One of second graphic types is displayed for each CPU and indicates the application group that is executing on that processor. The display may also provide information indicative of the CPU utilization for each CPU.

On such display provides an graphic indication of all of the CPUs in a system to which an application group has been assigned. This graphic display provides a user with an over view of which CPUs in a system have been assigned to a particular application group and which CPUs in a system are available to be assigned to an application group. Additional displays provide the ability to determine all (or a subset of) applications that have been assigned to a CPU in conjunction with a measure of that CPUs utilization. In this way, a user can visually determine the balance of applications across a multiprocessor system.

BRIEF DESCRIPTION OF THE DRAWINGS

The file of this patent contains at least one drawing/photograph executed in color. Copies of this patent with color drawings(s)/photograph(s) will be provided by the Office upon request and payment of the necessary fee.

DETAILED DESCRIPTION OF ILLUSTRATIVE EMBODIMENTS

Figure 1:
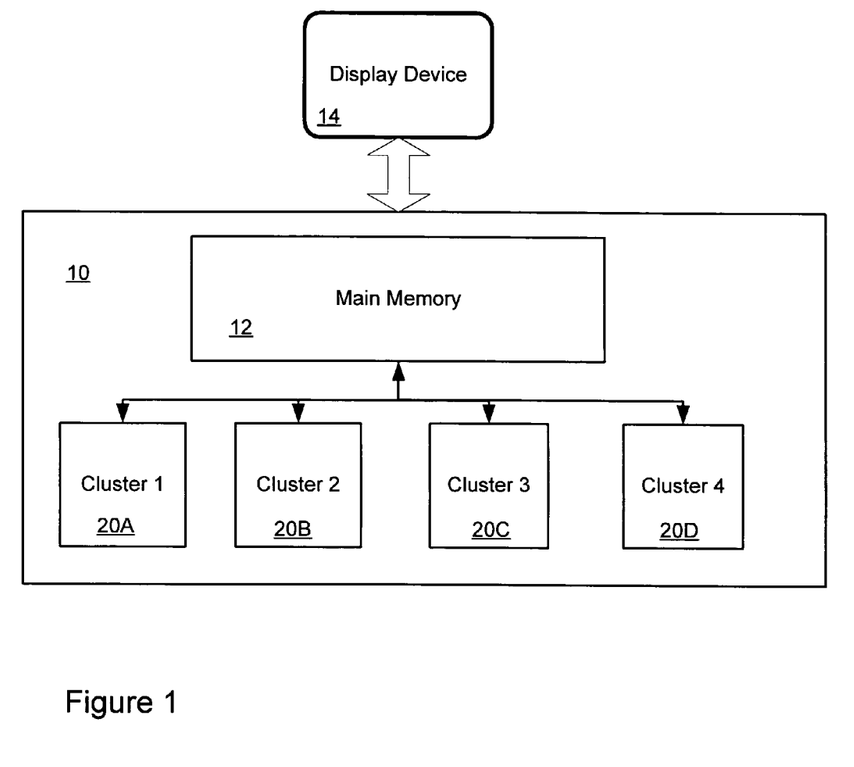
FIG. 1 is a diagram of an exemplary multiprocessor system in which groups of CPU's are organized in clusters.
Figure 2:
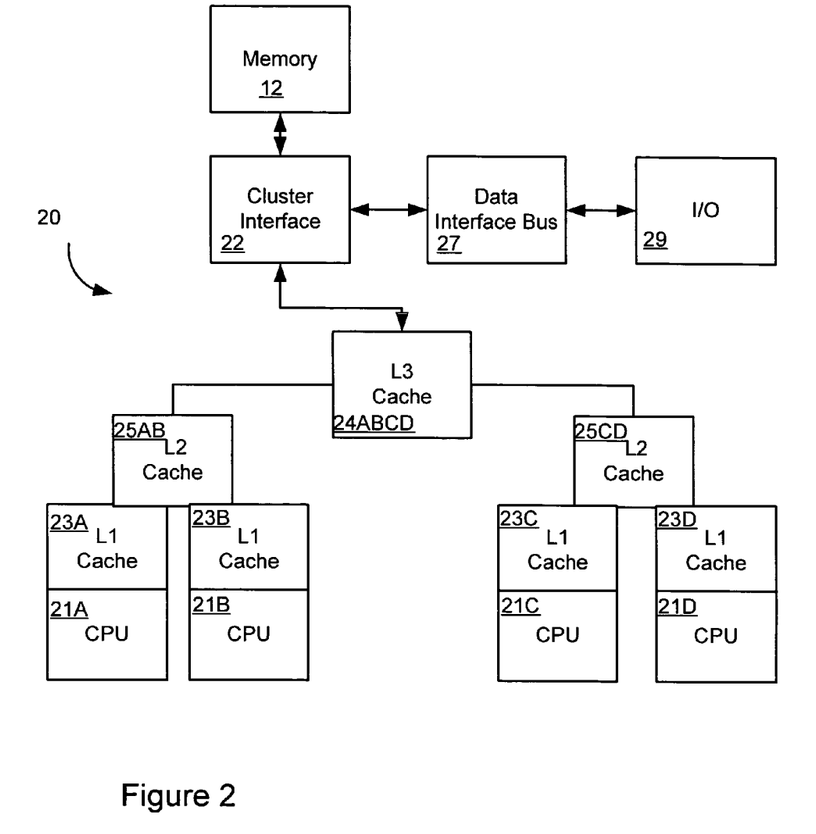
FIG. 2 is a diagram of a portion of a multiprocessor system illustrating the memory sharing among various CPUs.

FIG. 1 illustrates a multiprocessor system 10 wherein multiple processors are grouped in clusters. The exemplary system has four clusters of microprocessors (e.g., 20A-20D) that share a common memory 12. The system is connected to a display device 14, such as a computer monitor, LCD display, plasma display, etc., that can be used to display information about the multiprocessor system 10 according to aspects of the invention. Although the display device 14 is shown for illustrative purposes as connected directly to system 10, the display device may be connected in any number of well know ways, including by way of a computer. FIG. 2 illustrates further detail of the multiprocessor system 10, regarding the composition of an exemplary cluster 20. Each cluster 20 has multiple CPUs. In this example, there are four CPUs, 21A-21D. Each CPU has an associated level 1 cache, e.g., CPU 21A has associated level 1 cache 23A, CPU 21B has associated level 2 cache, and so on. The level 1 cache is the highest speed memory available to a corresponding CPU.

Level 2 cache is shared among the various CPU's within a cluster. For example, CPUs 21A and 21B share level 2 cache 21AB. All four processors share a level 3 cache, e.g., 21ABCD. Finally, main memory 12 can be accessed by all of the CPUs in the system. The level 1 cache is the highest performance cache and the best performance of an application will result when the level 1 cache contains all of the data that is needed for a particular application thread. If the data needed for a thread is not found in level 1 cache, e.g., 23A, the system checks for the information in level 2 cache, e.g., 25AB, then level 3 cache, e.g., 24ABCD and finally main memory 12. Main memory 12 typically has the lowest performance. Hence, moving or copying from main memory 12 provides the greatest performance degradation. Moreover, context switching an application group (or a particular thread from an application group) from one cluster over to another cluster can cause significant performance degradation if such a switch is not performed in a timely way or is performed too frequently.

An application group as used herein is the set of applications, as well as a number of associated threads, programs, etc. that are used by a single "application." In other words, the application group may comprise more that the single application executable but also represents affiliated processes needed to carry out the task of the primary application.

System 10 is initially set up with application groups assigned to various CPUs in the system. Beginning with the highest priority application group, CPUs are allocated to the application group from within the same cluster to take advantage of the level 3 cache. Because the level 3 cache is connected to all of the CPUs in a cluster, when a thread runs in the same cluster there is an increased chance that the processor cache has the data needed by the thread. If a thread runs on a CPU in a different cluster from one time slice to the next, there is an increased chance that the data needed by the thread will not be in the cluster's level 3 cache. If this data is not found in the cluster's level 3 cache, the thread has to wait until the memory or the system finds the data, and then the data has to be transferred either from memory or from another cluster's level 3 cache to the memory, and then to the cluster's level 3 cache where that the thread is running. At that point, the thread can use that data.

When possible, keeping the threads in a single cluster will increase the chance that the data needed by a thread will be in that cluster's level 3 cache, thereby increasing performance by not having to go to the memory for the data. The result is managed system performance and ensures that application group's load is properly balanced across a multiprocessor system.

Previously, displaying processor utilization on computer systems has been primarily through the use of task manager or the performance utility, both of which are provided by the Windows operating system. The task manger and performance manager provide the mechanism to adequately display the amount of utilization of each processor on a system. However, these tools are limited in the number of processors that they can support and the amount of information that they provide. Percent processor utilization is the percentage of time that a processor is executing a non-Idle thread. It is a primary indicator of processor activity. It is calculated by measuring the time that the processor spends executing the thread of the Idle process in each sample interval, and subtracting that value from 100%. (Each processor has an Idle thread which consumes cycles when no other threads are ready to run). It can be viewed as the percentage of the sample interval spent doing useful work. This is the average percentage of busy time observed during the sample interval. It is calculated by monitoring the time the service was inactive, and then subtracting that value from 100%.

The Microsoft performance utility does not conveniently show processor utilization in the form of a bar graph when there are more than 10 processors on a system. Each processor has a logical identifier that follows a simple numbering scheme: "0, 1, 2, 3, 4, . . . " etc. For example, if there are ten processors on a system, the processors will be represented on a display with identifiers from 0 through 9, and the performance utility will display bars for each of these processors, from left-to-right, in ascending order. However, if there are more than ten processors on the system, it becomes apparent that the performance utility sorts the processor identifiers alphabetically rather than numerically. For example, thirty-two processors will be represented in the following order:

0, 10, 11, 12, 13, 14, 15, 16, 17, 18, 19, 2, 20, 21, 22, 23, 24, 25, 26, 27, 28, 29, 3, 30, 31, 4, 5, 6, 7, 8, 9

Figure 3:
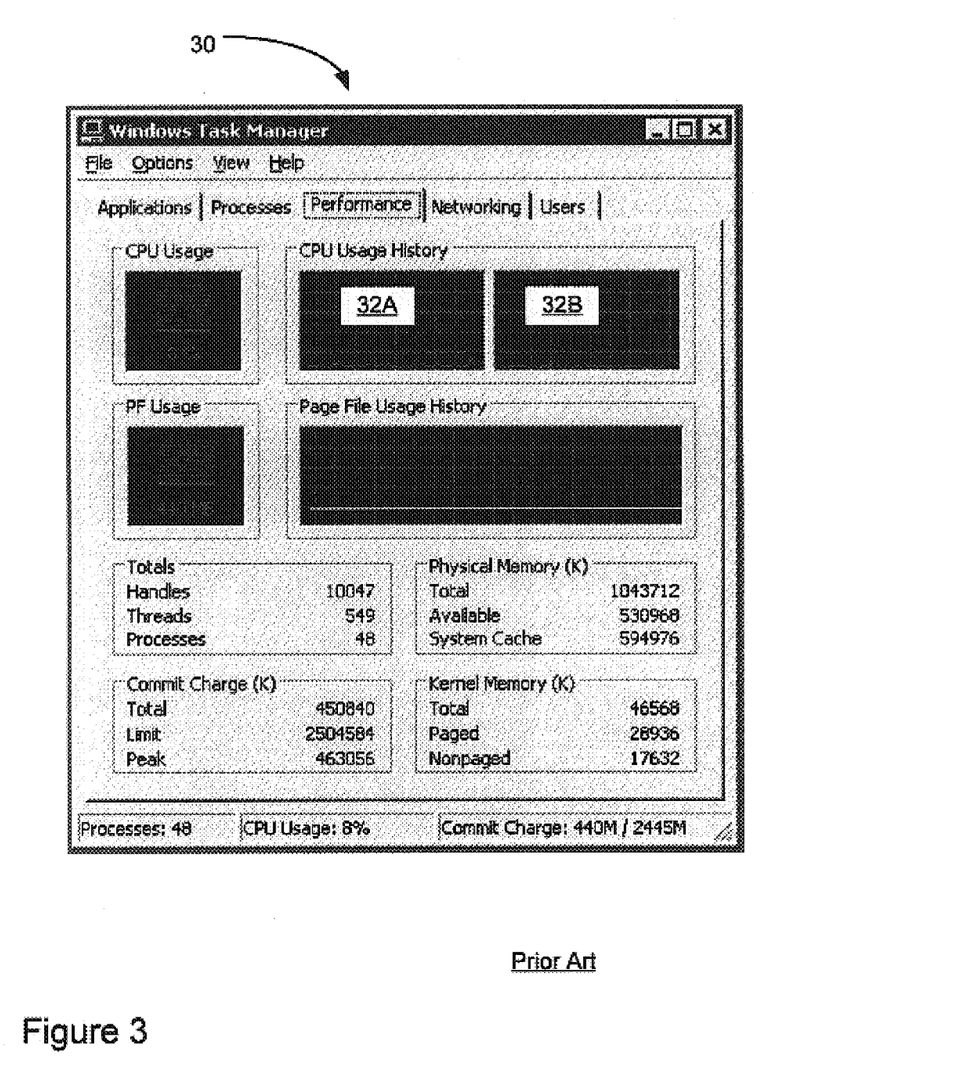
FIG. 3 is an illustration of prior art CPU usage monitor.

FIG. 3 is an example of the prior art task manager on a 2-processor system. The task manager processor display 30 does, in fact, display its processor utilization information in numeric order (32A, 32B). However, neither task manager nor performance manager show any processor identifier below the display so that a user can readily identify the data being displayed with a particular processor. When a system has less than four (or even eight) processors, this is not a big problem. However, when a system has twelve or more processors, it is very difficult to determine which data is associated with which processor. With task manager, one can count left-to-right to match data with processors (a tedious task if a user is looking for processor 19 of 32). With the performance utility, this strategy is not possible. Additionally, neither display provides any information about application groups that may be defined on the system. The application group feature allows a user to manage the system processors by assigning the processors to logical groups. Both the performance utility and task manager have no knowledge of application groups and cannot display information about them.

The present invention provides graphic displays that display processor usage on a display device. The method and system provide a first graphic type indicative of a processor. For example, for all of the CPUs in a system (or some subset thereof) a graphic is provided that is indicative of that processor. Additionally, on the same display, a second graphic type is provided that is indicative of an application group. One of the second graphic types is displayed for each CPU and indicates the application group that is executing on that processor. The display may also provide information indicative of the CPU utilization for each CPU.

Figure 4A:
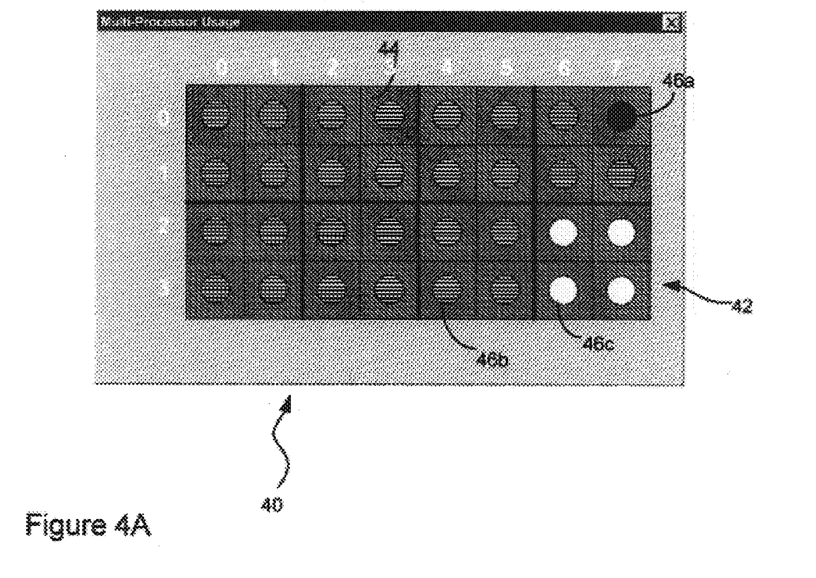
FIGS. 4A and 4B are example displays according to an aspect of the invention that provide a display of processor usage and application group assignment.

FIG. 4A provides an example illustration of aspects of the present invention. In this example, a CPU usage display 40 provides information about cluster, and application groups that are executing on a particular cluster. One display is preferably provided for each application group so that a user can easily view what CPUs have been assigned to an application group and which CPUs are available to have an application group assigned to them. A cluster of four CPUs, e.g. 42, is demarcated by the heavy lines. Within each cluster, a graphic 46a, 46b, 46c, etc is provided that represents a CPU physically joined in a cluster. Each CPU graphic, e.g., 46a, 46b, 46c can further provide an indication of its status. For example, a color, shading, or pattern provides and indication of whether a CPU can be assigned to an application group or not, or whether the CPU is part of the system. In the example of FIG. 4, a white circle, e.g., 46c, indicates that the CPU is not part of the system, a black circle indicates that the CPU, e.g., 46a, is available to be assigned to an application group, and a lined circle indicates that the CPU, e.g., 46b, has been assigned to an application group. The background color, e.g., 44, can have a color, shading, or pattern that corresponds to the application group.

Figure 4B:
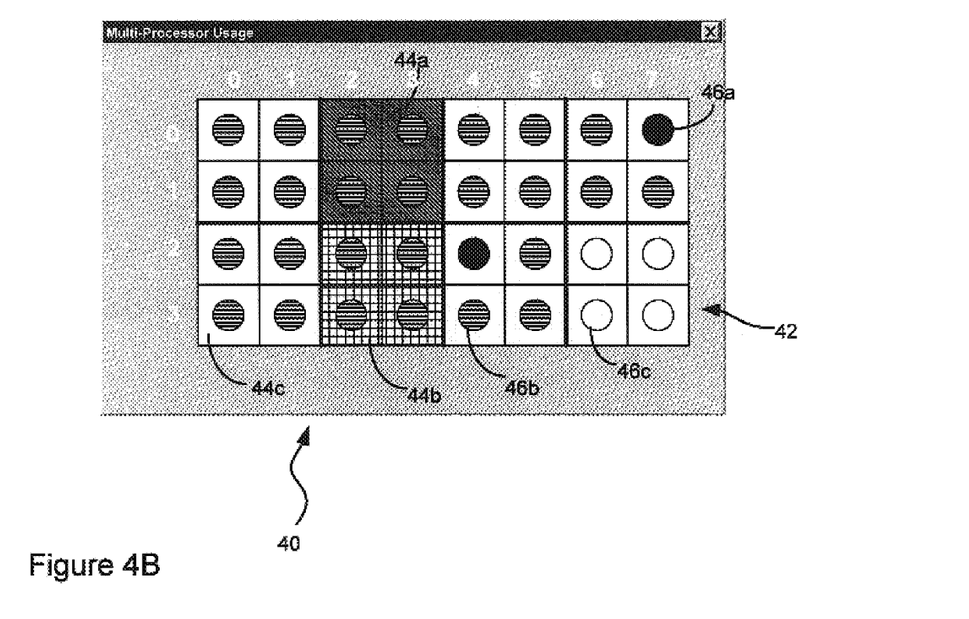

Alternatively, as illustrated in FIG. 4B, a combined display can be provided to show where application groups are currently assigned. In that case, each cluster or CPU area, e.g., 44a, 44b, can be colored, patterned, or shaded indicative of the application group assigned to that cluster or CPU. A white color or special color, pattern or shading, can be used to indicate multiple application groups were assigned to a CPU or cluster.

Figure 5A:
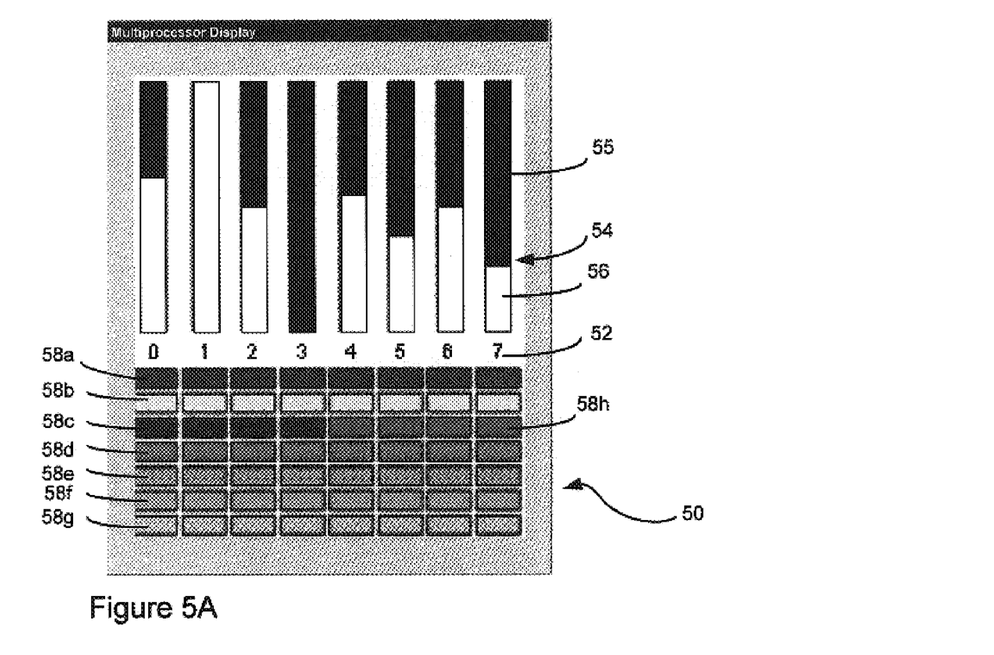
FIGS. 5A and 5B further illustrate processor usage according to aspects of the invention.

FIG. 5A further illustrates the multiprocessor usage display in accordance with an aspect of the invention. In this display, multiple vertical bars, e.g., 54, show the utilization of a particular CPU in the form of a percentage (0-100) of the full bar. This bar will be referred to herein as a processor bar. A colored region 56 (shown in white) within the bar will rise and fall according to the utilization of the processor. At 100% utilization, e.g., processor bar 1, the colored region will be at full height. At 50% utilization, e.g., processor bar 2, the colored region will be half of its full height. At 0% utilization, e.g., processor bar 3, the colored region will have no height and not be visible. Preferably, the bars are arranged from left-to-right so that the processors are ordered by their logical names, numerically. Below each processor bar, the name of the processor is displayed, e.g., 0, 1, 2, etc. Preferable, the color of the colored region in the processor bar matches the color assigned to the application group to which the processor is assigned.

The color of a processor bars shows the relationship between the processors on the system and the application groups of the system. If only one application group is associated with a processor, then the processor bar for that processor will use the color of the application group. If more than one application group is associated with the same processor, then the processor bar for that processor will use a neutral color such as white as its color. Thus, seeing a white processor bar tells the user that that particular processor is assigned to multiple application groups. If no application group is associated with a processor, its processor bar will use a color to indicate that condition such as black.

The processor bar display is very useful for seeing the relationship between multiple processors and application groups. If many or all of the processors are assigned to more than one application group, a group stack is a series of blocks, e.g. 58*a*-58*g*, appears beneath a processor bar. In the group stack, there is one block for each application group that uses a particular processor. Thus, by viewing a processor bar and its group stack, a user can see how many application groups are using that processor. Furthermore, the blocks in the group stack for a processor bar are color-coded to match the application groups that they represent. If a user is familiar with the colors of the application groups, the user can tell which application groups are using a processor. If the user hovers the cursor over one of the blocks in a group stack, the name of the application group represented by that block will be displayed.

Figure 5B:
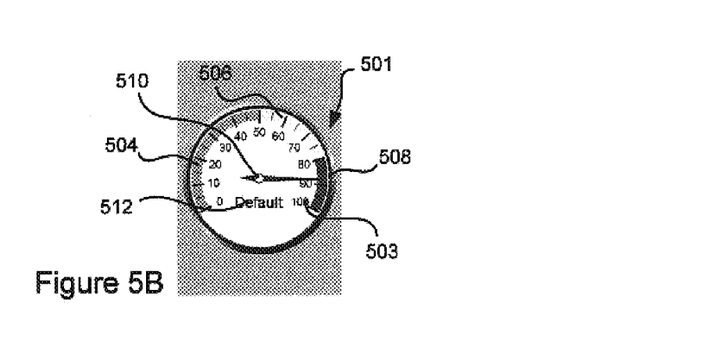

FIG. 5B provides an alternative display mechanism for illustrating CPU utilization. In this embodiment, a gauge 501, rather than a bar, provides a representation of a percentage value in a graphical manner. A CPU utilization number 503 from 0 to 100 that is passed to the gauge will cause needle 510 on gauge 501 to move to the appropriate position. During run-time, the appearance of gauge 501 can also change. Safe 504, caution 506, and danger 508 zones (in the form of colored regions) can also be displayed. If a dimming feature is enabled, the various zones will appear dimmed until gauge needle 510 points into one of these zones 504, 506, 508. At that time, the respective zone 504, 506, 508 will be displayed at full intensity. The dimming feature can also be disabled so all the zones appear at full intensity at all times. Or the dimming feature can be set so that a zone 504, 506, 508 will not be displayed unless needle 510 is in that zone. In this way, a preferred CPU load can be set so that a user can visualize whether or not a particular CPU is under utilized, over utilized, or in the preferred range of utilization.

As with the processor bar embodiment, the gauge may also have its background color set to illustrate the assigned application group. Similarly, the gauge can be used with a group stack.

Gauge 501 can also be used to represent the CPU usage of all the processes of an application group (e.g., there is one gauge per application group). In that case, the gauge will not show CPU utilization for a particular processor but rather will show the load that an application group is causing across the system. This may provide an indication, for example, that an application group may need additional processor to be assigned to it.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of clustered multiprocessor systems, one skilled in the art will recognize that the present invention is not limited to such clustered multiprocessor systems as the present invention may apply to any number of existing or emerging multiprocessor systems. Therefore, the present invention should not be limited to any single embodiment, but rather construed in breadth and scope in accordance with the appended claims.

What is claimed:

1. A method comprising:
   displaying on a display of a display device a first graphic indicative of a processor usage for each one of at least two processors in a multiprocessor system, the processor usage comprising processor assignment, processor availability, and clustering; and
   displaying on said display device a second graphic indicative of an application assignment for each one of at least two application groups associated with each of said at least two processors.

2. The method as recited in claim 1 wherein said second graphic comprises a color indicative of the application assignment for each one of the at least two application groups.

3. The method as recited in claim 1 further comprising a graphic indicator indicating a group of said at least two processors wherein said group is indicative of a processor clustering.

4. The method as recited in claim 1 further comprising a graphic indicator of processor utilization associated with each of said at least two processors.

5. The method as recited in claim 4 wherein said graphic indicator comprises a gauge.

6. The method as recited in claim 5 wherein the gauge includes bands that reflect ranges of processor utilization.

7. The method as recited in claim 4 wherein said graphic indicator comprises a bar.

8. The method as recited in claim 1 wherein blocks associated with the second graphic indicate an application group assigned to a processor.

9. The method as recited in claim 1 wherein each one of the at least two application groups comprises at least one independently, computer-executable process.

10. An apparatus comprising:
    a memory;
    a display device in electrical communication with a multiprocessor system having at least two processors, the display device having a display;
    computer-executable instructions stored in said memory and operable to display on said display device a first graphic indicative of a processor usage for each one of the at least two processors, the processor usage comprising processor assignment, processor availability, and clustering; and
    computer-executable instructions stored in said memory and operable to display on said display device a second graphic indicative of an application assignment for each one of at least two application groups associated with each of said at least two processors.

11. The apparatus as recited in claim 10 wherein said second graphic comprises a color indicative of the application assignment for each one of the at least two application groups.

12. The apparatus as recited in claim 10 further comprising a graphic indicator indicating a group of said at least two processors wherein said group is indicative of a processor clustering.

13. The apparatus as recited in claim 12 further comprising a graphic indicator of processor utilization associated with each of said at least two processors.

14. The apparatus as recited in claim 13 wherein said graphic indicator comprises a gauge.

15. The apparatus as recited in claim 14 wherein the gauge includes bands that reflect ranges of processor utilization.

16. The apparatus as recited in claim 13 wherein said graphic indicator comprises a bar.

17. The apparatus as recited in claim 10 wherein blocks associated with the second graphic indicate an application group assigned to a processor.

18. The apparatus as recited in claim 10 wherein each one of the at least two application groups comprises at least one independently, computer-executable process.

19. A computer-readable medium bearing computer readable instructions for carrying out the acts comprising:
   displaying on a display of a display device a first graphic indicative of a processor usage for each one of at least two processors in a multiprocessor system, the processor usage comprising processor assignment, processor availability, and clustering; and
   displaying on said display device a second graphic indicative of an application assignment for each one of at least two application groups associated with each of said at least two processors.

20. The computer readable medium as recited in claim 19 wherein said second graphic comprises a color indicative of the application assignment for each one of the at least two application groups.

21. The computer-readable medium as recited in claim 19 further comprising a graphic indicator indicating a group of said at least two processors wherein said group is indicative of a processor clustering.

22. The computer-readable medium as recited in claim 19 further comprising a graphic indicator of processor utilization associated with each of said at least two processors.

23. The computer-readable medium as recited in claim 22 wherein said graphic indicator comprises a gauge.

24. The computer-readable medium as recited in claim 23 wherein said gauge comprises bands that reflect ranges of processor utilization.

25. The computer-readable medium as recited in claim 22 wherein said graphic indicator comprises a bar.

26. The computer-readable medium as recited in claim 19 wherein blocks associated with the second graphic indicate an application group assigned to a processor.

27. The computer-readable medium as recited in claim 19 wherein each one of the at least two application groups comprises at least one independently, computer-executable process.

* * * * *